United States Patent
Yamasaki et al.

(10) Patent No.: US 10,563,082 B2
(45) Date of Patent: Feb. 18, 2020

(54) POLYOLEFIN COATING COMPOSITION

(71) Applicant: TOYOBO CO., LTD., Osaka (JP)

(72) Inventors: Hokuto Yamasaki, Hyogo (JP); Kenji Kashihara, Hyogo (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 16/479,264

(22) PCT Filed: Jan. 15, 2018

(86) PCT No.: PCT/JP2018/000758
§ 371 (c)(1),
(2) Date: Jul. 19, 2019

(87) PCT Pub. No.: WO2018/135418
PCT Pub. Date: Jul. 26, 2018

(65) Prior Publication Data
US 2019/0382611 A1 Dec. 19, 2019

(30) Foreign Application Priority Data
Jan. 20, 2017 (JP) .................................. 2017-008336

(51) Int. Cl.
| | |
|---|---|
| *C09D 123/26* | (2006.01) |
| *C09D 145/02* | (2006.01) |
| *C09D 5/00* | (2006.01) |
| *C09D 7/20* | (2018.01) |

(52) U.S. Cl.
CPC ............ *C09D 123/26* (2013.01); *C09D 5/002* (2013.01); *C09D 145/02* (2013.01); *C09D 7/20* (2018.01)

(58) Field of Classification Search
None
See application file for complete search history.

(56) References Cited

U.S. PATENT DOCUMENTS 6,852,198 B1    2/2005   Yamazaki et al.

FOREIGN PATENT DOCUMENTS

| JP | 55-104337 | 8/1980 |
|---|---|---|
| JP | 59-136358 | 8/1984 |
| JP | 61-152755 | 7/1986 |
| JP | 61152755 A * | 7/1986 |
| JP | 4-108876 | 4/1992 |
| JP | 2002-37934 | 2/2002 |
| JP | 2006-225551 | 8/2006 |
| JP | 2013-10248 | 1/2013 |

OTHER PUBLICATIONS

International Search Report dated Feb. 20, 2018 in International (PCT) Application No. PCT/JP2018/000758.
Notice of Reasons for Refusal dated Apr. 9, 2019 (drafted Apr. 5, 2019) in Japanese Application No. 2018-563303, with English translation.

* cited by examiner

*Primary Examiner* — Vu A Nguyen
(74) *Attorney, Agent, or Firm* — Wenderoth, Lind & Ponack, L.L.P.

(57) ABSTRACT

The present invention provides a coating composition that has excellent storage stability and that is capable of forming a coating film having excellent water resistance, chemical resistance such as gasohol resistance and fuel resistance, and adhesion. The coating composition comprises an acid-modified polyolefin (A), a coumarone-indene resin (B), and a hydrocarbon-based solvent (C), wherein the coumarone-indene resin (B) is contained in an amount of 25 to 400 parts by mass, per 100 parts by mass of the acid-modified polyolefin (A). The coating composition further comprises at least one of an ester-based solvent or ketone-based solvent (D).

6 Claims, No Drawings

POLYOLEFIN COATING COMPOSITION

TECHNICAL FIELD

The present invention relates to a coating composition comprising an acid-modified polyolefin and a coumarone-indene resin, the coating composition having excellent storage stability, adhesion to a polyolefin substrate, and chemical resistance.

BACKGROUND ART

Demand for chemical resistance of primer coating compositions used for forming coating films on automobile bumpers etc. has been increasing. To satisfy such demand, various proposals have been made.

Patent Literature 1, for example, discloses a primer coating composition using an acid-modified chlorinated polyolefin and a dispersion resin.

Patent Literature 2 discloses an aqueous coating composition using an acid-modified polyolefin and a coumarone resin or indene resin.

CITATION LIST

Patent Literature
PTL 1: JP2013-10248A
PTL 2: JP2006-225551A

SUMMARY OF INVENTION

Technical Problem

However, the primer coating composition disclosed in PTL 1 uses an acid-modified chlorinated polyolefin as a primer resin component, which is environmentally problematic, and does not exhibit sufficient chemical resistance. Further, the composition disclosed in PTL 2 is an aqueous dispersion, and does not have sufficient water resistance and chemical resistance.

An object of the present invention is to provide a coating composition that is used as a primer of a polypropylene substrate for an automobile bumper etc., and that has excellent adhesion, water resistance, and chemical resistance, such as gasohol resistance and fuel resistance, as well as excellent storage stability compared to conventional bumper primers.

Solution to Problem

The present inventors conducted extensive research to solve the above problems, and consequently found that by mixing an acid-modified polyolefin, a specific coumarone-indene resin, and a specific solvent, a coating film having excellent adhesion and chemical resistance as well as excellent coating composition storage stability can be obtained. The present invention was thus accomplished.

Specifically, the present invention includes the following.
A coating composition comprising:
an acid-modified polyolefin (A),
a coumarone-indene resin (B), and
a hydrocarbon-based solvent (C),
the coumarone-indene resin (B) being contained in an amount of 25 to 400 parts by mass, per 100 parts by mass of the acid-modified polyolefin (A), and
the coating composition further comprising at least one of an ester-based solvent or ketone-based solvent (D).

It is preferable that the acid-modified polyolefin (A) has an acid value of 5 to 40 mgKOH/g-resin and a weight average molecular weight of 20,000 to 180,000.

The hydrocarbon-based solvent (C) is preferably contained in an amount of 200 to 3000 parts by mass, per 100 parts by mass of the acid-modified polyolefin (A). It is also preferable that the coating composition further comprises an alcohol-based solvent (E).

A primer coating composition for a polyolefin substrate, comprising the coating composition described above.

Advantageous Effects of Invention

According to the present invention, a coating composition that has excellent storage stability and that is capable of forming a coating film having excellent water resistance, chemical resistance such as gasohol resistance and fuel resistance, and adhesion can be obtained.

DESCRIPTION OF EMBODIMENTS

The coating composition of the present invention is a multiple component-based composition that comprises an acid-modified polyolefin (A), a coumarone-indene resin (B), and a hydrocarbon-based solvent (C), and further contains an ester-based solvent or ketone-based solvent (D). The composition of the present invention is also useful as a primer for a polyolefin substrate. As a polyolefin substrate, a polypropylene substrate is particularly preferred.

The coating composition of the present invention comprises an acid-modified polyolefin and a coumarone-indene resin (B), wherein the coumarone-indene resin (B) is contained in an amount of 25 to 400 parts by mass, per 100 parts by mass of the acid-modified polyolefin (A). Because the acid-modified polyolefin (A) and the coumarone-indene resin (B) are contained, the coating film produced from the coating composition has excellent adhesion and chemical resistance, and excellent coating composition storage stability. The coumarone-indene resin (B) is preferably contained in an amount of 30 parts by mass or higher, more preferably 60 parts by mass or higher, and even more preferably 100 parts by mass or higher, per 100 parts by mass of the acid-modified polyolefin (A). An overly small amount of coumarone-indene resin (B) may reduce the storage stability of the coating composition. The coumarone-indene resin (B) is preferably contained in an amount of 350 parts by mass or lower, more preferably 300 parts by mass or lower, and even more preferably 200 parts by mass or lower. An overly large amount of coumarone-indene resin (B) may reduce adhesion or chemical resistance.

Acid-Modified Polyolefin (A)

The acid-modified polyolefin (A) used in the present invention is preferably obtained by grafting at least one of polyethylene, polypropylene, and a propylene-α-olefin copolymer with at least one of α,β-unsaturated carboxylic acid and acid anhydride thereof.

The propylene-α-olefin, copolymer mainly comprises propylene that is copolymerized with an α-olefin. Examples of α-olefins include ethylene, 1-butene, 1-heptene, 1-octene, 4-methyl-1-pentene, vinyl acetate, and the like, which can be used singly or in a combination of two or more. Preferred among these α-olefins are ethylene and 1-butene. Although the proportion of the propylene component and the α-olefin component in the propylene-α-olefin copolymer is not limited, the propylene component is preferably 50 mol % or higher, and more preferably 70 mol % or higher. When the amount of ethylene component in the propylene-α-olefin copolymer is 50 mol % or lower, the coating composition of the present invention shows excellent adhesion, chemical resistance, and storage stability. Further, even when the amount of ethylene component is 30 mol % or lower, the coating composition of the present invention shows, sufficient adhesion, chemical resistance, and storage stability. An amount of ethylene component of 9 mol % or lower also poses no problem.

Examples of at least one of α,β-unsaturated carboxylic acid and acid anhydride thereof include maleic acid, itaconic acid, citraconic acid, and acid anhydride thereof. Among these, acid anhydride is preferred, and maleic acid anhydride is more preferred. Specific examples include acid-modified polypropylene, acid-modified propylene-ethylene copolymers, acid-modified propylene-butene copolymers, acid-modified propylene-ethylene-butene copolymers, and the like. These acid-modified polyolefins can be used singly or in a combination of two or more.

The weight average molecular weight (Mw) of the acid-modified polyolefin (A) is preferably within the range of 20,000 to 180,000, and more preferably 40,000 to 180,000. If the weight average molecular weight is less than the above value, chemical resistance maybe inferior. In contrast, if the weight average molecular weight is higher than the above value, the storage stability of the coating composition may be problematic.

In terms of adhesion to the polyolefin resin substrate, the acid value of the acid-modified polyolefin (A) is preferably within the range of 5 to 40 mg KOH/g-resin, and more preferably 10 to 30 mg KOH/g-resin. If the acid value is less than the above value, the storage stability of the coating composition may be problematic, In contrast, if the acid value is greater than the above value, chemical resistance may be inferior.

The melting point (Tm) of the acid-modified polyolefin (A) is preferably 40° C. or higher, and more preferably 50° C. or higher. If the melting point is overly low, chemical resistance and adhesion may be inferior. The melting point is preferably 120° C. or lower, and more preferably 100° C. or lower. If the melting point is overly high, the storage stability of the coating composition may be inferior.

The heat of fusion (ΔH) of the acid-modified polyolefin (A) is preferably 5 J/g or higher, and more preferably 10 J/g or higher. If the heat of fusion is overly low, adhesion and chemical resistance may be inferior. The heat of fusion (ΔH) is preferably 60 J/g or lower, and more preferably 50 J/g or lower. If the heat of fusion is overly high, the storage stability of the coating composition may be inferior.

It is preferable that the acid-modified polyolefin (A) is substantially not chlorinated. A substantially chlorinated acid-modified polyolefin (A) is environmentally problematic and may reduce chemical resistance. The expression "substantially not chlorinated" means that the chlorine content is preferably 10 wt % or lower, more preferably 5 wt % or lower, even more preferably 1 wt % or lower, and particularly preferably 0 wt %.

The acid-modified polyolefin (A) is preferably crystalline. Crystalline acid-modified polyolefins are advantageous because they have superior adhesion and chemical resistance, as compared with amorphous polyolefins. Crystalline refers to one that shows a clear melting peak in the process of temperature increase at 20° C./min from −100° C. to 250° C. measured by a differential scanning calorimeter (DSC).

The method for producing the acid-modified polyolefin (A) is not particularly limited. Examples of the method include a radical grafting reaction in which a radical species is formed in a polymer serving as a main chain, and unsaturated carboxylic acid and acid anhydride are graft-polymerized using the radical species as a polymerization starting point.

Although the radical generator is not particularly limited, an organic peroxide is preferably used. Examples of organic peroxides include, but are not limited to, peroxides, such as di-tert-butylperoxy phthalate, tert-butyl hydroperoxide, dicumyl peroxide, benzoyl peroxide, tert-butylperoxy benzoate, tert-butyl peroxy-2-ethylhexanoate, tert-butyl peroxy pivalate, methyl ethyl ketone peroxide, di-tert-butyl peroxide, and lauroyl peroxide; azonitriles, such as, azobisisobutyronitrile and azobisisopropionitrile; and the like.

Coumarone-Indene Resin (B)

It is preferable that the coumarone-indene resin (B) in the present invention mainly contains coumarone and indene as monomer components. The total amount of coumarone and indene in the coumarone-indene resin is preferably 50 mass % or higher, and more preferably 60 mass % or higher. Examples of coumarone include coumarone, methylcoumarone, and the like. Examples of indene include indene, methylindene, and the like. Examples of monomer-components other than coumarone and indene include styrene, vinyltoluene, dicyclopentadiene, and the like. The monomer composition is suitably selected according to the use etc. of resin; however, coumarone is generally about 1 to 80 mass % and indene is generally about 20 to 95 mass %. It is also preferable to contain 1 to 20 mass % of styrene. The coumarone-indene resin may also include a hydroxy group or a carboxy group.

The softening temperature of the coumarone-indene resin (B) is not particularly limited. It is preferably 60° C. or higher, and more preferably 70 to 170° C. from the viewpoint of applicability to desired application usage, and excellent blending properties, coating properties, and adhesion.

The weight average molecular weight (Mw) of the coumarone-indene resin (B) is preferably within the range of 100 to 2000, and more preferably 500 to 1500. If the weight average molecular weight is less than the above value, adhesion of the coating composition may be inferior. In contrast, if the weight average molecular weight is higher than the above value, the storage stability of the coating composition may be problematic.

The acid value of the coumarone-indene resin (B) is not particularly limited, and it is preferably 2.0 mg KOH/g-resin or lower, and more preferably 1.0 mg KOH/g-resin or lower. If the acid value is greater than the above value, the storage stability of the coating composition may be problematic.

The hydroxy value of the coumarone-indene resin (B) is not particularly limited, and it is preferably 5 mgKOH/g-resin or higher, and more preferably 10 mgKOH/g-resin. If the hydroxy value is less than the above value, the adhesion of the coating composition may be inferior. The hydroxy value of the coumarone-indene resin (B) is preferably 200 mgKOH/g-resin or lower, and more preferably 150 mgKOH/g-resin or lower. If the hydroxy value is greater than the above value, the storage stability of the coating composition may be inferior.

The coating composition of the present invention may include a pigment. Examples of pigments include titanium oxide, calcium carbonate, barium sulfate, talc, carbon black, and the like. Such pigments can be used singly or in a combination of two or more. The total amount of the pigment is preferably 50 to 500 parts by mass, and more preferably 75 to 350 parts by mass, per 100 parts by mass of the acid-modified polyolefin.

In the present invention, the coating composition contains a hydrocarbon-based solvent (C), and further contains at least one of an ester-based solvent or a ketone-based solvent (D). The hydrocarbon-based solvent (C) is preferably contained in an amount of 200 parts by mass or higher, and more preferably 300 parts by mass or higher, per 100 parts by mass of the acid-modified polyolefin (A), The amount of the hydrocarbon-based solvent (C) is preferably 3000 parts by mass or lower, more preferably 2500 parts by mass or lower, and even more preferably 1800 parts by mass or lower. When the amount of the hydrocarbon-based solvent (C) is in the above range, excellent coating composition storage stability can be attained.

The total amount of the ester-based solvent or ketone-based solvent (D) is preferably 20 parts by mass or higher, and more preferably 50 parts by mass or higher, per 100 parts by mass of the acid-modified polyolefin (A). The total amount of the ester-based solvent or ketone-based solvent (D) is preferably 500 parts by mass or lower, more preferably 400 parts by mass or lower, and even more preferably 200 parts by mass or lower. When the total amount of the ester-based solvent or ketone-based solvent (D) is within the above range, excellent coating composition storage stability can be attained.

Examples of the hydrocarbon-based solvent (C) include aromatic hydrocarbon-based solvents, such as toluene, xylene, and Solvesso (registered trademark) 100, and alicyclic hydrocarbon-based solvents, such as cyclohexane, methylcyclohexane, and ethylcyclohexane. Of these, xylene and cyclohexane are preferred. In particular, a combination of xylene, Solvesso (registered trademark) 100, and cyclohexane is preferred.

Examples of ester-based solvents among the ester-based or ketone-based solvents (D) include methyl acetate, ethyl acetate, propyl acetate, isopropyl acetate, butyl acetate, isobutyl acetate, amyl acetate, and the like. Preferred among these is ethyl acetate. Examples of ketone-based solvents include acetone, methyl ethyl ketone, methyl isobutyl ketone, and methyl amyl ketone. Preferred among these is methyl ethyl ketone. It is also possible to combine two or more members selected from ester solvents and ketone solvents.

The coating composition may further contain an alcohol-based solvent (E). Addition of the alcohol-based solvent (E) can further improve the storage stability of the coating composition. The amount of the alcohol-based solvent (E) when added is preferably 5 parts by mass or higher, and more preferably 10 parts by mass or higher, per 100 parts by mass of the acid-modified polyolefin. The amount of the alcohol-based solvent (E) is preferably 200 parts by mass or lower, and more preferably 150 parts by mass or lower. When the amount of the alcohol-based solvent (E) is within the above range, remarkably excellent coating composition storage stability can be attained. Examples of the alcohol-based solvent (E) include methanol, ethanol, normal propyl alcohol, isopropyl alcohol, normal butanol, isobutanol, 2-butanol, and the like.

Solvent-Based Coating Composition

The coating composition of the present invention comprises the acid-modified polyolefin (A), coumarone-indene resin (B), and hydrocarbon-based solvent (C), and further contains at least one of the ester-based solvent or ketone-based solvent (D). The coating composition of the present invention can be obtained by dilution as needed.

It is preferable, that the coating composition of the present invention is substantially a solvent-based coating composition. Specifically, the total of the carbon-based solvent (C), ester-based solvent or ketone-based solvent (D), and alcohol-based solvent (E) is preferably 90 mass % or higher, more preferably 95 mass % or higher, and even more preferably 99 mass % or higher when the total amount of the solvents contained in the coating composition is 100 mass %. There is no problem when the total of these components is 100 mass %. The coating composition of the present invention can exhibit excellent water resistance and chemical resistance because it is substantially a solvent-based coating composition.

The viscosity of the coating composition when applied is not particularly limited. It is within the range of 10 to 300 mPa·sec, and more preferably within the range of 15 to 200 mPa·sec because excellent application workability and finish appearance are attained.

The coating composition proposed in the present invention may include an acrylic resin, alkyd resin, urethane resin, and the like insofar as the effect of the present invention is not impaired.

EXAMPLES

The present invention is described in more detail below with reference to Examples. However, the present invention is not limited to the Examples.

Production Example of Acid-Modified Polyolefin (A)

Production Example 1

100 parts by mass of propylene-butene copolymer polymerized with a metallocene catalyst (propylene component: 76 mol % and 1-butene component: 24 mol %), 150 parts by mass of toluene, 9 parts by mass of maleic acid anhydride, and 4 parts by mass of di-tert-butyl peroxide were placed in a 1-L autoclave. The mixture was heated to 140° C., and then stirred for 3 hours. After cooling the resulting reaction mixture, the reaction mixture was poured into a container containing a large amount of methyl ethyl ketone, and the resin was precipitated. Then, the solution containing the resin was centrifuged to thereby separate and purify an acid-modified propylene-butene copolymer in which maleic acid anhydride was graft-polymerized, (poly)maleic acid anhydride, and low-molecular-weight substances. After drying under reduced pressure at 70° C. for 5 hours, an acid-modified propylene-butene copolymer (acid value: 14 mg KOH/g-resin, weight average molecular weight: 90,000, Tm: 70° C.) was obtained. The acid-modified polyolefin produced by this production example was referred to as A-1.

Production Example 2

An acid-modified propylene-butene copolymer (acid value: 40 mg KOH/g-resin, weight average molecular weight: 90,000, Tm: 70° C.) was obtained in the same manner as in Production Example 1, except that the amounts of maleic acid anhydride and di-tert-butyl peroxide were respectively changed to 30 parts by mass and 3 parts by mass. The acid-modified polyolefin produced by this production example was referred to as A-2.

Production Example 3

An acid-modified propylene-butene copolymer (acid value: 5 mg KOH/g-resin, weight average molecular weight: 90,000, Tm: 70° C.) was obtained in the same manner as in Production Example 1, except that the amounts of maleic acid anhydride and di-tert-butyl peroxide were respectively changed to 3 parts by mass and 7 parts by mass. The acid-modified polyolefin produced by this production example was referred to as A-3.

Production Example 4

An acid-modified propylene-butene copolymer (acid value: 14 mg KOH/g-resin, weight average molecular weight: 180,000, Tm: 70° C.) was obtained in the same manner as in Production Example 1, except that the amounts of maleic acid anhydride and di-tert-butyl peroxide were respectively changed to 12 parts by mass and 3 parts by mass. The acid-modified polyolefin produced by this production example was referred to as A-4.

Production Example 5

An acid-modified propylene-butene copolymer (acid value: 14 mg KOH/g-resin, weight average molecular weight: 20,000, Tm: 70° C.) was obtained in the same manner as in Production Example 1, except that the amounts of maleic acid anhydride and di-tert-butyl peroxide were respectively changed to 5 parts by mass and 10 parts by mass. The acid-modified polyolefin produced by this production example was referred to as A-5.

Preparation Example of Acid-Modified Polyolefin (A) Solution 100 parts by mass of A-1, 280 parts by mass of cyclohexane, and 120 parts by mass of xylene were placed in a 500-mL four-necked flask equipped with a water-cooled reflux condenser and a stirrer. The mixture was heated to 70° C. while stirring, and stirring was continued for 1 hour to thereby obtain an A-1 solution.

In the same manner as the A-1 solution, A-2 to A-5 solutions were obtained by dissolving A-2 to A-5.

Chlorinated Polyolefin 100 parts by mass of chlorinated polyolefin (A-6) having a molecular weight of 70,000 and a chlorine content of 21 wt %, 280 parts by mass of cyclohexane, and 120 parts by mass of butyl acetate were placed in a 500-mL four-necked flask equipped with a water-cooled reflux condenser and a stirrer. The mixture was heated to 70° C. while stirring, and stirring was continued for 1 hour to thereby obtain an A-6 solution.

Preparation Example of Coumarone-Indene Resin (B) Solution 100 parts by mass of coumarone-indene resin (B-1) having a weight average molecular weight of 950, a softening temperature of 120° C., a hydroxy value of 30 mgKOH/g-resin, and an acid value of 1.0 mgKOH/g-resin or lower, 50 parts by mass of Solvesso 100, and 50 parts by mass of cyclohexane were placed in a 500-mL four-necked flask equipped with a water-cooled reflux condenser and a stirrer. The mixture was stirred for 2 hours at room temperature to thereby obtain a B-1 solution. As the coumarone-indene resin (B-1), Nitto resin (registered trademark) coumarone V-120S produced by Nitto Chemical Co., Ltd. was used.

100 parts by mass of coumarone-indene resin (B-2) having a weight average molecular weight of 160, a hydroxy value of 50 mgKOH/g-resin, and an acid value of 1.0 mgKOH/g-resin or lower, 50 parts by mass of Solvesso 100, and 50 parts by mass of cyclohexane were placed in a 500-mL four-necked flask equipped with a water-cooled reflux condenser and a stirrer. The mixture was stirred for 2 hours at room temperature to thereby obtain a B-2 solution. As the coumarone-indene resin (B-2), Nitto resin (registered trademark) coumarone L-5 produced by Nitto Chemical Co., Ltd. was used.

Preparation Example of Alkyd Resin Solution 100 parts by mass of alkyd resin (B-3) that is derived from soybean oil and has an oil length of 41 wt %, phthalic anhydride of 42 wt %, and an acid value of 8.0 mgKOH/g-resin or lower, 50 parts by mass of Solvesso 100, and 50 parts by mass of cyclohexane were placed in a 500-mL four-necked flask equipped with a water-cooled reflux condenser and a stirrer. The mixture was stirred for 2 hours at room temperature to thereby obtain a B-3 solution. As the alkyd resin (B-3), ALUKIDIR (registered tradename) 1307-60-EL produced by DIC Corporation was used.

Analytical measurement and evaluation of the thus-obtained acid-modified polyolefins were performed in the following manner.

Measurement of Acid Value of Acid-Modified Polyolefin (A)

The acid value (mg KOH/g-resin) of the acid-modified polyolefin (A) in the present invention is a value calculated by FT-IR (produced by Shimadzu Corporation, FT-IR8200PC) from the following formula using coefficient (f) obtained from a calibration curve prepared with a chloroform solution of maleic acid anhydride (produced by Tokyo Chemical Industry Co., Ltd.), and absorbance (I) of the elastic peak (1780 cm−1) of a carbonyl (C=O) bond of succinic anhydride in an acid-modified polyolefin solution.

Acid value (mg KOH/g-resin)=[absorbance (I)×(f)×2×molecular weight of potassium hydroxide×1000 (mg)/molecular weight of succinic anhydride]

Molecular weight of succinic anhydride: 100.07

Molecular weight of potassium hydroxide: 56.11

Measurement of Acid Value of Coumarone-Indene Resin (B)

The acid value of coumarone-indene resin (B) was measured according to JIS K 5601-2-1 (1999).

Measurement of Weight Average Molecular Weight (Mw)

The weight average molecular weights of acid-modified polyolefin (A) and coumarone-indene resin (B) in the present invention are values measured by an Alliance e2695 gel permeation chromatograph (hereinafter "GPC;" standard substance: polystyrene resin, mobile phase: tetrahydrofuran, column: Shodex KF-806 KF-803, column temperature: 40° C., flow rate: 1.0 mL/min, detector: photodiode array detector (wavelength 254 nm=ultraviolet light)) produced by Nihon Waters K.K.

Measurement of Melting Point

The melting point of the acid-modified polyolefin (A) in the present invention is a value measured by a differential scanning calorimeter (hereinafter "DSC," Q-2000, produced by TA Instruments Japan Inc.) from the top temperature of the melting peak when melting by heating at a rate of 20° C./min and resinification by cooling are performed, and melting by heating is again performed.

Measurement of Softening Temperature

The softening temperature of coumarone-indene resin (B) in the present invention was measured according to JIS K 2207 (1996).

Coating Composition

Example 1

The coating composition shown in Example 1 was produced by the following manner. 40 parts by mass of xylene and a pigment having the mass ratio shown in Table 1 were added to 500 parts by mass of the A-1 solution (A-1, 100 parts by mass), and the mixture was dispersed using a bead mill until the size evaluated by a grindometer became 10 μm or lower, thus obtaining a pigment dispersion. The B-1 solution was added to the pigment dispersion (A-1, 100 parts by mass) in a manner such that the amount of B-1 was 100 parts by mass. Subsequently, the mixture was mixed with 110 parts by mass of cyclohexane and 105 parts by mass of methyl ethyl ketone, thus obtaining a coating composition shown in Example 1.

Examples 2 to 9

The acid-modified polyolefin (A), coumarone-indene resin (B), hydrocarbon-based solvent (C), ester-based solvent or ketone-based solvent (D), and alcohol-based solvent (E) were mixed in the proportion shown in Table 1. Except for the proportion, the components were mixed in the same manner as in Example 1 to obtain the coating compositions shown in Examples 2 to 8. The ester-based solvent, ketone-based solvent, and alcohol-based solvent were added to a pigment dispersion.

Comparative Examples 1 to 6

The acid-modified polyolefin (A), coumarone-indene resin (B), hydrocarbon-based solvent (C), ester-based solvent or ketone-based solvent (D), and alcohol-based solvent (E) were mixed in the proportion shown in Table 2. Except for the proportion, the components were mixed in the same manner as in Example 1 to obtain coating compositions shown in Comparative Examples 1 to 5. The ester-based solvent, ketone-based solvent, and alcohol-based solvent were added to a pigment dispersion. Comparative Example 6 was not evaluated because a coating composition was not produced due to lack of hydrocarbon-based solvent (C).

Coating Composition Stability

The stability of the coating compositions produced in the Examples and Comparative Examples was evaluated for the following items. Tables 1 and 2 show the results.

The coating compositions were allowed to stand at −5° C. and 50° C. for 10 days to evaluate the appearance and viscosity of each coating composition. The viscosity was measured by a Ford cup (No. 4, 25° C.)

Evaluation Criteria:

A: No appearance change. Thickening occurred in 5 seconds.
B: No appearance change. Thickening occurred in more than 5 seconds to 10 seconds.
C: No appearance change. More than 10 seconds were required for thickening.
D: Change in appearance, More than 10 seconds were required for thickening.

Production of Test Coating Sheet 100 parts by mass of a coating composition obtained in the Example or Comparative Example, 30 parts by mass of Solvesso 100, and 30 parts by mass of toluene were mixed to adjust the solvent composition to that when applied. Hereinbelow, the adjusted coating compositions are referred to as diluted coating compositions.

A polypropylene substrate was degreased with isopropyl alcohol to make a test sheet. The diluted coating composition produced as above was applied by spraying to the test sheet to a dry film thickness of 10 μm. As a colored base coating composition, Retan (registered trademark) PG white (tradename, produced by Kansai Paint Co., Ltd.) was applied by spraying to the diluted coating composition side of the test sheet to a dry film thickness of 50 μm. Heating was then performed in an oven at 80° C. for 30 minutes, thereby obtaining a test coating sheet including a laminated coating film. Various coating film performance tests described below were performed on the test coating sheet.

Coating Film Performance Test

Test coating sheets produced as above were evaluated for the following items. Tables 1 and 2 show the results.

(1) Initial Adhesion

Cross-cuts reaching the substrate of each test coating sheet were made using a cutter knife to form a grid of 100 squares (1 mm×1 mm). Adhesive cellophane tape was applied to the surface of the grid portion, and the tape was peeled off rapidly at 20° C. Then, the number of squares of the coating film remaining was checked.

Evaluation Criteria:
A: 100 squares, remained.
B: 90 to 99 squares remained.
C: 41 to 89 squares remained.
D: The number of squares remaining was 40 or less.

(2) Water Resistance

After each test coating sheet was immersed in hot water at 40° C. for 10 days, the surface of the coating film was observed.

Evaluation Criteria:
A: No appearance change, and the surface of the coating film was remarkably excellent.
B: Almost no appearance change, and the surface of the coating film was excellent.
C: The coating film swelled. Abnormalities, such as blistering, were confirmed.

(3) Gasohol Resistance

Each test coating sheet was immersed in a test solution having a weight ratio of gasoline/ethanol=90/10 at 20° C., and the coating surface conditions such as blistering and peeling after 120 minutes were observed and evaluated according to the following criteria.

Evaluation Criteria:
A: No abnormalities.
B. Blistering or peeling with a diameter of less than 3 mm occurred.
C: Blistering or peeling with a diameter of greater than 3 mm occurred.

(4) Fuel Resistance

A test solution was prepared based on an alcohol-added fuel solution for test designated by ISO1817. The test solution comprises 23.35 wt % of 2.2.4-trimethylpentane, 42.25 wt % of toluene, 12.68 wt % of diisobutylene, 15.0 wt % of methanol, 4.22 wt % of ethanol, 0.5 wt % of water, and 20 ppm of formic acid. The test coating sheet was immersed in the test solution at 25° C. for 120 minutes. Thereafter, the test coating sheet was air-dried at room temperature for 30 minutes, and cross-cuts reaching the substrate of each test coating sheet were made using a cutter knife to form a grid of 100 squares (1 mm×1 mm). Adhesive cellophane tape was applied to the surface of the grid portion, and the tape was peeled off rapidly at 20° C. Then, the number of squares of the coating film remaining was checked.

Evaluation Criteria:
A: 100 squares remained.
B: 90 to 99 squares remained.
C: 41 to 89 squares remained.
D: The number of squares remaining was 40 or less.

TABLE 1

|  |  |  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- | --- |
| Solvent-based coating composition | Acid-modified polyolefin (A) | A-1 | 100 |  |  |  |  | 100 | 100 | 100 | 100 |
|  |  | A-2 |  | 100 |  |  |  |  |  |  |  |
|  |  | A-3 |  |  | 100 |  |  |  |  |  |  |
|  |  | A-4 |  |  |  | 100 |  |  |  |  |  |
|  |  | A-5 |  |  |  |  | 100 |  |  |  |  |
|  | Coumarone-indene resin (B) | B-1 | 100 | 100 | 100 | 100 | 100 |  | 25 | 400 | 100 |
|  |  | B-2 |  |  |  |  |  | 100 |  |  |  |

TABLE 1-continued

|  |  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
|  | Hydrocarbon-based solvent (C) | Xylene | 160 | 160 | 160 | 160 | 160 | 160 | 100 | 400 | 160 |
|  |  | Cyclohexane | 440 | 440 | 440 | 440 | 440 | 440 | 280 | 1100 | 440 |
|  |  | Solvesso 100 | 50 | 50 | 50 | 50 | 50 | 50 | 30 | 130 | 50 |
|  | Ketone-based solvent (D) | Methylethyl ketone | 105 |  |  |  |  |  |  | 260 |  |
|  |  | Methyl isobutyl ketone |  | 90 |  |  |  |  |  |  |  |
|  |  | Methyl amyl ketone |  |  |  |  | 105 |  | 90 |  |  |
|  | Ester-based solvent (D) | Butyl acetate |  |  |  |  |  | 90 |  |  |  |
|  |  | Ethyl acetate |  |  | 105 |  |  |  |  |  | 105 |
|  |  | Amyl acetate |  |  |  |  |  |  | 65 |  |  |
|  | Alcohol-based solvent (E) | Isopropyl alcohol |  | 15 |  |  | 15 | 15 |  |  |  |
|  | Pigment | Titanium oxide | 100 | 100 | 100 | 100 | 100 | 100 | 60 | 250 | 100 |
|  |  | Carbon black | 5 | 5 | 5 | 5 | 5 | 5 | 5 | 15 | 5 |
|  |  | Barium sulfate | 20 | 20 | 20 | 20 | 20 | 20 | 15 | 50 | 20 |
|  |  | Talc | 7.5 | 7.5 | 7.5 | 7.5 | 7.5 | 7.5 | 5 | 20 | 7.5 |
| Evaluation results | Coating film evaluation | Initial adhesion | A | A | A | A | A | A | A | A | A |
|  |  | Water resistance | A | A | A | A | A | A | A | A | A |
|  |  | Gasohol resistance | A | A | A | A | A | A | A | A | A |
|  |  | Fuel resistance | A | A | A | A | A | A | A | B | A |
|  | Coating composition stability | −5° C. | A | A | A | A | A | A | A | A | A |
|  |  | 50° C. | B | A | B | B | A | A | B | B | B |

TABLE 2

|  |  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Solvent-based coating composition | Acid-modified polyolefin (A) | A-1 | 100 | 100 | 100 |  | 100 | 100 |
|  | Chlorinated polyolefin | A-6 |  |  |  | 100 |  |  |
|  | Coumarone-indene resin (B) | B-1 | 100 | 550 | 10 | 100 |  | 100 |
|  | Alkyd resin | B-3 |  |  |  |  | 100 |  |
|  | Hydrocarbon-based solvent (C) | Xylene | 160 | 520 | 90 | 160 | 160 |  |
|  |  | Cyclohexane | 440 | 1400 | 240 | 440 | 440 |  |
|  |  | Solvesso 100 | 155 | 160 | 30 | 50 | 50 |  |
|  | Ketone-based solvent (D) | Methylethyl ketone |  | 340 | 60 | 90 | 90 | 500 |
|  |  | Methyl isobutyl ketone |  |  |  |  |  |  |
|  |  | Methyl amyl ketone |  |  |  |  |  |  |
|  | Ester-based solvent (D) | Butyl acetate |  |  |  |  |  |  |
|  |  | Ethyl acetate |  |  |  |  |  |  |
|  |  | Amyl acetate |  |  |  |  |  |  |
|  | Alcohol-based solvent (E) | Isopropyl alcohol |  |  |  | 15 | 15 | 150 |
|  | Pigment | Titanium oxide | 100 | 325 | 100 | 100 | 100 | 100 |
|  |  | Carbon black | 5 | 15 | 5 | 5 | 5 | 5 |
|  |  | Barium sulfate | 20 | 65 | 20 | 20 | 20 | 20 |
|  |  | Talc | 7.5 | 25 | 7.5 | 7.5 | 7.5 | 7.5 |
| Evaluation results | Coating film evaluation | Initial adhesion | A | A | A | A | A | — |
|  |  | Water resistance | A | A | A | A | A | — |
|  |  | Gasohol resistance | A | A | A | A | A | — |
|  |  | Fuel resistance | A | D | A | D | A | — |
|  | Coating composition stability | −5° C. | C | A | D | A | C | — |
|  |  | 50° C. | D | B | D | B | D | — |

INDUSTRIAL APPLICABILITY

The coating composition of the present invention can form a coating film having excellent water resistance, chemical resistance such as gasohol resistance and fuel resistance because it contains an acid-modified polyolefin and a coumarone-indene resin. Accordingly, the coating composition of the present invention is useful as a primer of a polypropylene substrate used for an automobile bumper etc.

The invention is claimed is:

1. A coating composition comprising:
   an acid-modified polyolefin (A),
   a coumarone-indene resin (B), and
   a hydrocarbon-based solvent (C),
   the acid-modified polyolefin (A) having a chlorine content of 0 wt %, or 5 wt % or lower,
   the coumarone-indene resin (B) being contained in an amount of 25 to 400 parts by mass, per 100 parts by mass of the acid-modified polyolefin (A),
   the coating composition further comprising at least one of an ester-based solvent or ketone-based solvent (D).

2. The coating composition according to claim 1, wherein the acid-modified polyolefin (A) has an acid value of 5 to 40 mgKOH/g-resin.

3. The coating composition according to claim 1, wherein the acid-modified polyolefin (A) has a weight average molecular weight of 20,000 to 180,000.

4. The coating composition according to claim 1, wherein the hydrocarbon-based solvent (C) is contained in an amount of 200 to 3000 parts by mass, per 100 parts by mass of the acid-modified polyolefin (A).

5. The coating composition according to claim 1, further comprising an alcohol-based solvent (E).

6. A primer coating composition for a polyolefin substrate, comprising the coating composition according to claim 1.

* * * * *